United States Patent
Zernickel et al.

(10) Patent No.: US 7,032,704 B2
(45) Date of Patent: Apr. 25, 2006

(54) ELECTRICALLY ASSISTED, POWER STEERING SYSTEM FOR MOTOR VEHICLES

(75) Inventors: Alexander Zernickel, Herzogenaurach (DE); Jörg Wagner, Oberreichenbach (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/888,895

(22) Filed: Jul. 9, 2004

(65) Prior Publication Data

US 2004/0238264 A1    Dec. 2, 2004

Related U.S. Application Data

(63) Continuation of application No. PCT/EP02/14626, filed on Dec. 20, 2002.

(30) Foreign Application Priority Data

Jan. 10, 2002    (DE) ................................ 102 00 609

(51) Int. Cl.
*B62D 5/04*    (2006.01)
*F16C 27/04*    (2006.01)
(52) U.S. Cl. ...................... 180/444; 384/567
(58) Field of Classification Search ................ 180/443, 180/444, 446; 384/565, 567
See application file for complete search history.

(56) References Cited

U.S. PATENT DOCUMENTS 6,422,336 B1 *    7/2002    Abele et al. ................. 180/446

FOREIGN PATENT DOCUMENTS

| DE | 21 23 981 | 12/1971 |
|----|-----------|---------|
| DE | 2 338 687 | 8/1974 |
| DE | 27 41 057 | 3/1979 |
| DE | 2 53 665 A1 | 1/1988 |
| DE | 197 47 638 C1 | 1/1999 |
| DE | 298 20 079 U1 | 2/1999 |
| DE | 198 28 513 A1 | 12/1999 |
| DE | 199 35 283 A1 | 11/2000 |
| GB | 2004600 A * | 4/1979 |
| JP | 03 2 77 809 A | 12/1991 |

* cited by examiner

*Primary Examiner*—Kevin Hurley
(74) *Attorney, Agent, or Firm*—Volpe and Koenig, P.C.

(57) ABSTRACT

An electrically assisted, power steering system for motor vehicles having an input shaft (6) connected to a pinion shaft (2) by a torsionally elastic member (5) is supported in a steering housing (1) by a rolling bearing. The rolling bearing is formed as an elastic, flexible roller bearing (13), whose cylinder rollers (13.5, 13.6) have at least at one peripheral position an elastically deformable cylinder roller (13.6), having a diameter that is slightly greater than a diameter of the other cylinder rollers (13.5). In this way, an exact guidance of the input shaft (6) is achieved, so that the applied steering torque can be used accurately by an evaluation unit (15) for controlling the servo motor (7).

5 Claims, 3 Drawing Sheets

ELECTRICALLY ASSISTED, POWER STEERING SYSTEM FOR MOTOR VEHICLES

BACKGROUND

The invention relates to an electrically assisted, power steering system for motor vehicles with an input shaft, which is in active connection with a steering wheel for transfer of a steering torque, with an output member, which is in active connection with the wheels to be steered, with a servo motor, which exerts power assistance directly or indirectly to the input shaft or the output member, wherein the input shaft and the output member are connected to each other by a torsionally elastic member such that limited rotational motion is possible between the input shaft and the output member, and with a detection unit, which contains at least one sensor for detecting the direction and the intensity of the steering torque acting on the input shaft, wherein the input shaft is supported on its end facing the steering wheel in a housing by a rolling bearing.

Such electrically assisted power steering systems for motor vehicles are superior in many respects relative to hydraulic servo steering systems. They work with an electronically regulated electro-motor and thus replace the conventional hydraulic system. This reduces the technical expense, because for regulation and steering support, only an unproblematic medium, electrical current, is still necessary. Simultaneously, the manufacturer can increase its productivity thanks to simpler system integration, faster assembly, and also optimum adaptation to the vehicle. And because the electrical control is adjusted optimally to the riding dynamics and vehicle handling, the ride properties of the car are significantly improved. In addition, this new type of steering requires significantly less energy than the hydraulic solution, because energy is needed only when steering is actually performed. A difference from conventional servo steering, no permanent hydraulic pressure is required. Outside of the servo unit, there are no aggregate systems: steering valve, steering pump, oil reservoir, and high-pressure hoses can be eliminated. This saves weight and simplifies assembly.

Such advantageous, electrically assisted, power steering systems are sufficiently known to someone skilled in the art. These can be taken, e.g., from DE 197 47 638 C1, DE 198 28 513 A1, DE 199 35 283 A1, and DE 298 20 079 U1. The steering torque is measured by a detection unit, which consists of at least one pulse generator and one sensor. The pulse generator and sensor are arranged at a distance from each other, wherein one of the two parts is connected to the input shaft. The input shaft is held in turn by a rolling bearing in a housing. It is obvious that the evaluation of the steering torque is influenced by the rolling bearing. For example, if there is too much bearing play, the function of the signal transmitter or sensor can be influenced in a negative way. This then transmits false control values to the servo motor, which has a negative effect on the steering behavior.

According to the prior state of the art, attempts have been made to overcome these disadvantages by exposing the input shaft to an exact guidance. This exact shaft guidance should enable in turn precise functioning of the pulse generator and sensor, which has a positive effect on the steering behavior, because the correct dosing of power from the support motor is introduced according to the real, determined steering torque. This was accomplished by the use of a solid rolling bearing, which was processed for reducing its radial play in a very expensive manner. This was achieved by grinding the tracks of the bearing. However, such a complicated solid rolling bearing is very expensive and also influences the costs of the power steering system.

SUMMARY

The object of the invention is therefore to prepare a power-assisted steering system, which can be produced economically in its entirety and which enables an exact detection of the steering torque.

This object is achieved according to the invention by providing an electrically assisted, power steering system for motor vehicles with an input shaft which is in active connection with a steering wheel for transfer of a steering torque and an output member which is in active connection with wheels to be steered. A servo motor, which exerts power assistance directly or indirectly onto the input shaft or the output member is provided and the input shaft and the output member are connected to each other by a torsionally elastic member, such that a limited rotational motion is possible between the input shaft and the output member. A detection unit, which contains at least one sensor for detecting the direction and the intensity of the steering torque acting on the input shaft is provided, and the input shaft is supported on its end facing the steering wheel in a housing by a roller bearing. The rolling bearing is formed as an elastic, flexible roller bearing, whose cylindrical rollers have at least at one peripheral position an elastically deformable cylindrical roller, whose diameter is slightly greater than the diameter of the remaining cylindrical rollers.

The bearing arrangement formed according to the invention guides the input shaft of the power-assisted steering system practically without play, wherein in the unloaded state, the elastic roller bodies carry the shaft. For increasing radial load, the elastically deformable cylinder rollers are reduced in their diameter until the input shaft is supported by the remaining cylinder rollers, which are not elastic in the sense of the invention. In this way, it is guaranteed that the input shaft is guided precisely under all loading conditions, so that the real steering torque can be detected by the evaluation unit and thus realistic response behavior of the servo motor is provided. The bearing according to the invention and including of two different cylinder rollers can be formed either as cageless or caged bearings.

Advantageous refinements of the invention are described in the detail below.

In on embodiment, the elastically deformable cylinder rollers are arranged at three peripheral positions uniformly spaced apart from each other. This arrangement has the advantage that the shaft is centered on all sides in a reliable way by three points.

In another embodiment, the elastically deformable cylinder rollers are formed as thin-walled, non-cutting shaped hollow cylinders. This has the advantage that, in the first place, the hollow cylinders can be manufactured in a simple way and in the second place, a weight reduction of the bearing, even if slight, is created.

According to another feature of the invention, the hollow cylinders are provided on both opposite ends with collars extending in the radial direction. These collars allow the elasticity behavior of the hollow rollers to be affected in a very simple way. If the radial extent of the collars is increased, the elastic compression of the hollow cylinders is made more difficult.

According to another embodiment of the invention, it has proven to be advantageous when the radial extent of the collars corresponds to the wall thickness of the hollow cylinders.

Another type of influence on the elasticity of the hollow cylinders is provided by hardening the hollow cylinders.

Finally, according to another feature of the invention, the outer surface of the hollow cylinders is milled.

BRIEF DESCRIPTION OF THE DRAWINGS

The invention is explained in more detail below based on a preferred exemplary embodiment.

In the drawings.

DETAILED DESCRIPTION OF THE PREFERRED EMBODIMENTS

Figure 1:
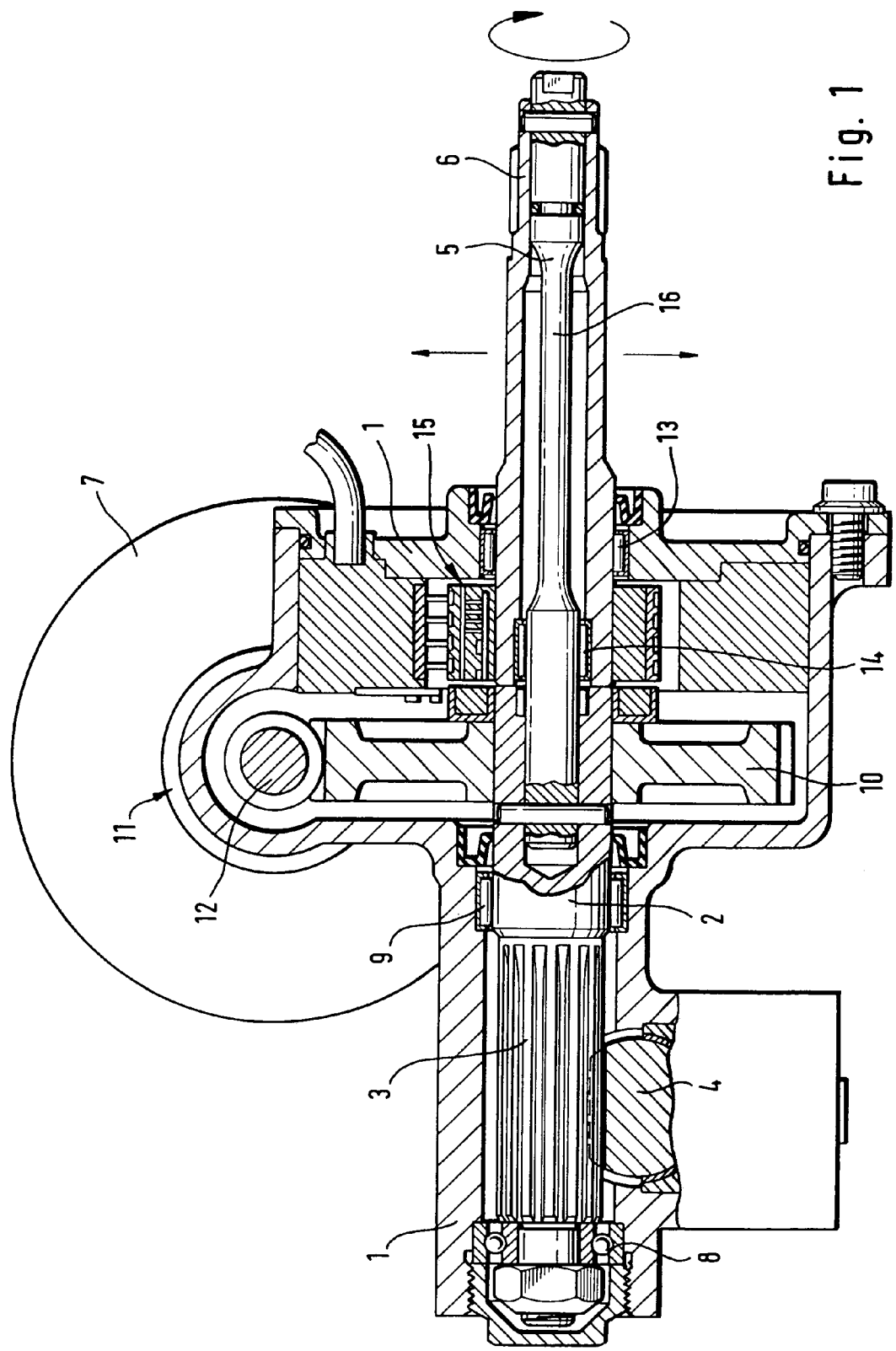
FIG. 1 is a longitudinal section through a power steering system using the example of rack-and-pinion steering according to prior state of the art.

The invention will be explained using the example of a power steering system with a rack-and-pinion gear. In one steering housing, designated as housing 1 for short, a pinion 3 connected to a pinion shaft 2 is supported so that it can rotate. The pinion 3 represents an output member, which is in active connection with the wheels to be steered (not shown) by means of a rack 4. The pinion shaft 2 is connected by a rotating rod 5 that can move about its axis 16 to an input shaft 6 of the steering gear. Instead of the rotating rod 5, another torsionally elastic member can also be used. The rack 4 is in drive connection with a servo motor 7 formed as an electro-motor. The pinion shaft 2 is held in the housing 1 on the left side of the pinion 3 by a ball bearing 8 and on the right side by a roller bearing 9. In the housing 1, a worm wheel 10 of a worm gear pair 11 is further mounted on the pinion shaft 2. The teeth of this worm wheel, which are not described in more detail, engage a worm 12. On one side, the input shaft 6 is held in the housing 1 in the direction of the not shown steering wheel by another roller bearing 13 and on the other side by another additional bearing 14 on the rotating rod 5, wherein the last mentioned bearing can also definitely be a sliding bearing.

A steering torque contacting the input shaft 6 and represented by an arc-shaped arrow generates an angle of rotation between the input shaft 6 and the pinion shaft 2. This angle of rotation is a measure for the steering torque and is measured by a detection unit 15, which includes the actual sensor and the pulse generator, wherein either the sensor or the pulse generator is connected to the input shaft 6. It can be seen that for a bearing 13 with greater radial play, the input shaft 6 can be deflected in the arrow direction upwards or downwards. However, due to this deflection of the input shaft 6 the steering torque is incorrectly forwarded by the detection unit 15, i.e., the servo motor 7 for steering assistance receives false control pulses, which do not agree with the actual steering torque. This is where the invention is put into place.

Figure 3:
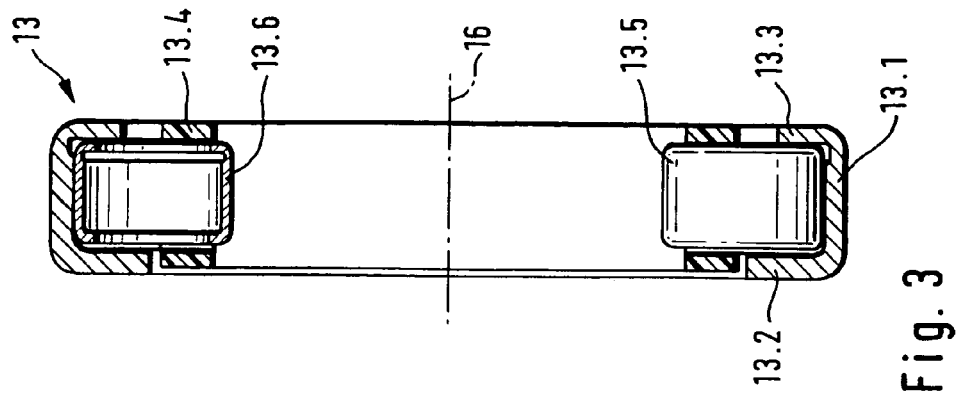
FIG. 3 is a longitudinal section through the roller bearing along the line III—III in FIG. 2.
Figure 2:
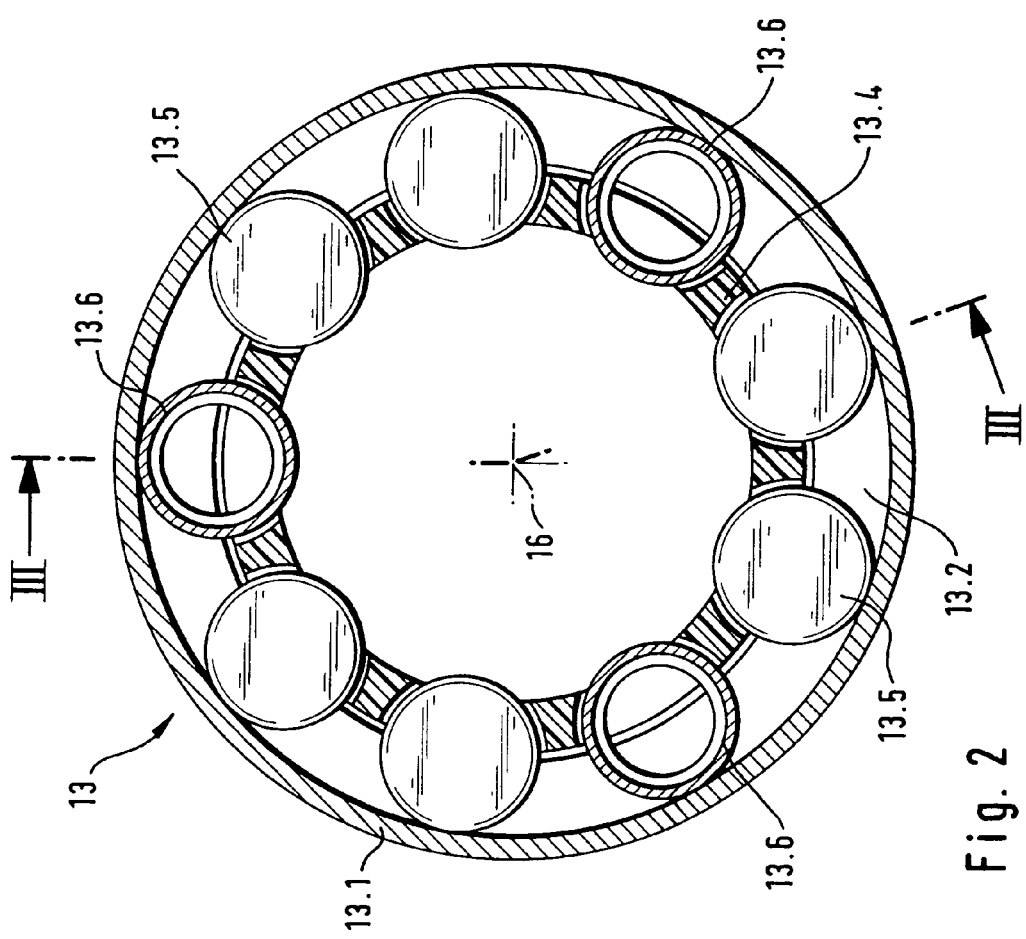
FIG. 2 is a cross sectional view through a roller bearing configured according to the invention for supporting the input shaft.
Figure 4:
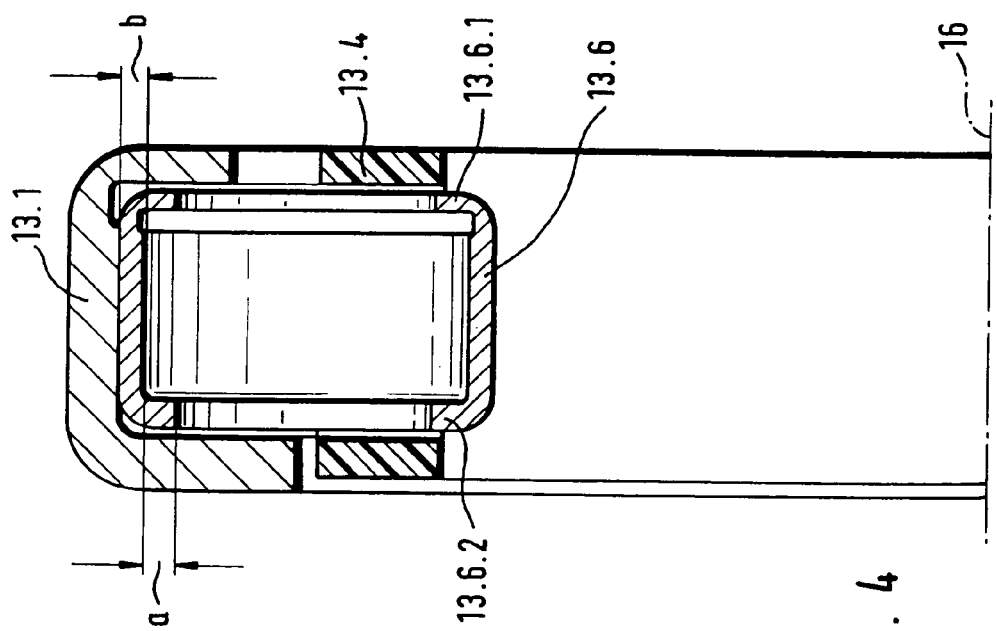
FIG. 4 is an enlarged view of the roller bearing according to the invention.

As shown in FIGS. 2, 3, and 4, the roller bearing 13 according to the invention includes the outer ring 13.1, which is provided on both the left side and also the right side with two collars 13.2 and 13.3 pointing inwards in the radial direction. A collar including solid cylindrical rollers 13.5 and elastically deformable cylindrical rollers 13.6 in the form of hollow cylindrical rollers with the bearing cage 13.4 rolls about the axis 16, wherein at three peripheral positions of the cage 13.4 spaced uniformly from each other, the hollow cylinders 13.6 are arranged, which are provided on both sides with a circumferential collar 13.6.1 and 13.6.2. In this way, the diameter of the hollow cylinder 13.6 should be slightly greater than that of the solid cylinder rollers 13.5. It is also conceivable that all of the roller bodies of the roller bearing 13 are formed as elastically deformable cylinder rollers 13.6.

Figure 5:
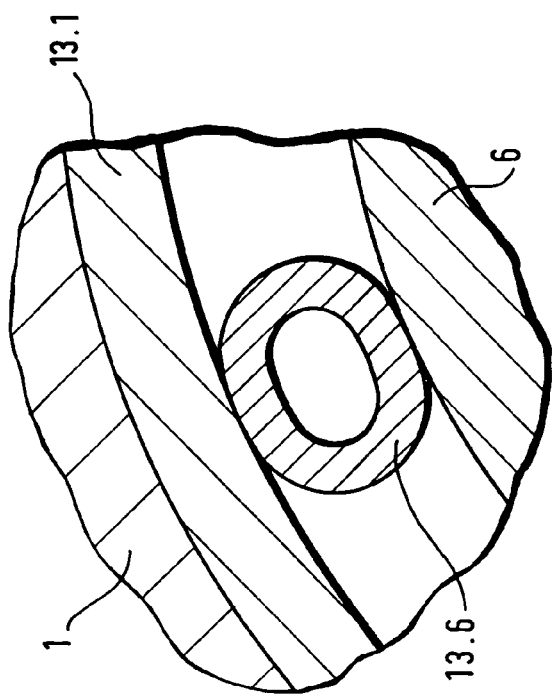
FIG. 5 is an enlarged view, partially broken away, showing the roller bearing according to the invention in the loaded state.

As FIG. 5 shows in particular, the hollow cylinders 13.6 are deformed in the unloaded state, i.e., they assume the shape of an ellipse, which then has a radial extent like the diameter of the solid, undeformed cylinder rollers 13.5. In this way, it is guaranteed that the input shaft 6 is always exactly centered and supported, i.e., both with and also without radial load. For a non-existent radial load, the input shaft 6 is held by the hollow cylinder 13.6, which is larger in diameter, while for an existing radial load, these are reduced in diameter, so that the load is held by the solid cylinder rollers 13.5 arranged inbetween. As FIG. 4 shows further, the radial extent a of the collars 13.6.1 and 13.6.2 of the hollow cylinders 13.6 correspond approximately to its thickness b of the outer surface. For the size relationships, it should be mentioned at this point that for roller bodies of the roller bearing 13 with a diameter of approximately 10 mm, a difference in diameter of approximately 50 μm between solid cylinder rollers 13.5 and elastically deformable cylinder rollers 13.6 produces the desired effect.

LIST OF REFERENCE SYMBOLS

1 Housing
2 Pinion shaft
3 Pinion
4 Rack
5 Rotating rod
6 Input shaft
7 Servo motor
8 Ball bearing
9 Roller bearing
10 Worm wheel
11 Worm gear pair
12 Worm
13 Roller bearing
13.1 Outer ring
13.2 Collar
13.3 Collar
13.4 Cage
13.5 Solid cylinder roller
13.6 Elastically deformable cylinder roller
13.6.1 Collar
13.6.2 Collar
14 Bearing
15 Detection unit
16 Axis
a Radial extent
b Thickness of outer surface

The invention claimed is:

1. Electrically assisted, power steering system for motor vehicles comprising an input shaft (6) which is in active connection with a steering wheel for transfer of a steering torque, an output member which is in active connection with wheels to be steered, a servo motor (7) which exerts power assistance directly or indirectly onto the input shaft (6) or the output member, the input shaft (6) and the output member are connected to each other by a torsionally elastic member, such that a limited rotational motion is possible between the input shaft (6) and the output member, and a detection unit (15) which includes at least one sensor for detecting a direction and an intensity of the steering torque acting on the input shaft (6), the input shaft (6) is supported on an end facing the steering wheel in a housing (1) by a roller bearing that is formed as an elastic, flexible roller bearing (13) and includes cylinder rollers (13.5, 13.6) at least one of which, located at a peripheral position, is an elastically deformable cylinder roller (13.6) having a diameter that is slightly greater than a diameter of the remaining cylinder rollers (13.5), the at least one elastically deformable cylinder roller (13.6) is formed as thin-walled, non-cutting shaped hollow cylinder that includes two opposing ends, each of the ends including a collar (13.6.1, 13.6.2) that extends radially inwardly.

2. Roller bearing (13) according to claim 1, wherein the at least one elastically deformable cylinder roller (13.6) comprises a plurality of the elastically deformable cylinder rollers (13.6) that are arranged at three peripheral positions spaced uniformly from each other.

3. Roller bearing (13) according to claim 1, wherein a radial extent (a) of the collars (13.6.1, 13.6.2) corresponds to a thickness (b) of an outer surface of the hollow cylinder.

4. Roller bearing (13) according to claim 1, wherein the hollow cylinders are hardened.

5. Roller bearing (13) according to claim 1, wherein an outer surface of the hollow cylinder is ground or milled.

* * * * *